United States Patent
Kobayashi et al.

(10) Patent No.: US 11,613,260 B2
(45) Date of Patent: Mar. 28, 2023

(54) ROAD SURFACE DETERMINATION APPARATUS

(71) Applicant: SUBARU CORPORATION, Tokyo (JP)

(72) Inventors: Goichi Kobayashi, Tokyo (JP); Masahiro Saito, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 421 days.

(21) Appl. No.: 16/751,227

(22) Filed: Jan. 24, 2020

(65) Prior Publication Data

US 2020/0307603 A1 Oct. 1, 2020

(30) Foreign Application Priority Data

Mar. 28, 2019 (JP) .............................. JP2019-062285

(51) Int. Cl.
*B60W 40/06* (2012.01)

(52) U.S. Cl.
CPC ......... *B60W 40/06* (2013.01); *B60W 2420/10* (2013.01); *B60W 2420/42* (2013.01); *B60W 2422/70* (2013.01); *B60W 2520/00* (2013.01)

(58) Field of Classification Search
CPC .............. B60W 40/06; B60W 40/068; B60W 2420/10; B60W 2420/42; B60W 2422/70; B60W 2520/00; B60W 2520/105; B60W 2530/20; G06V 20/588; B60T 8/172; B60T 2210/10; B60T 2210/12; G01N 19/02; B62D 6/006

See application file for complete search history.

(56) References Cited

U.S. PATENT DOCUMENTS

| | | | | |
|---|---|---|---|---|
| 5,640,324 A | * | 6/1997 | Inagaki | B60T 8/17552 701/72 |
| 6,079,513 A | * | 6/2000 | Nishizaki | B62D 15/0235 701/41 |
| 6,176,494 B1 | * | 1/2001 | Ichimaru | B60G 17/08 280/5.515 |

(Continued)

FOREIGN PATENT DOCUMENTS

| | | | | |
|---|---|---|---|---|
| CN | 104321230 A | * | 1/2015 | ......... B60G 17/0164 |
| EP | 2514640 A1 | * | 10/2012 | ......... B60C 23/0477 |

(Continued)

OTHER PUBLICATIONS

Japanese Office Action dated Feb. 8, 2023 in Japanese Patent Application No. 2019-062285 (2 pages in Japanese with English Translation).

*Primary Examiner* — Angelina Shudy
(74) *Attorney, Agent, or Firm* — Smith, Gambrell & Russell, LLP

(57) ABSTRACT

A road surface determination apparatus includes an acceleration detector and a road surface determination unit. The acceleration detector is configured to detect an acceleration of a vehicle body or a vibration transmission member configured to transmit vibration from a tire to the vehicle body. The road surface determination unit is configured to determine a condition of a surface of a road, using a determination value obtained by extracting a component of a predetermined frequency band from the acceleration detected by the acceleration detector and integrating the component.

18 Claims, 3 Drawing Sheets

(56) References Cited

U.S. PATENT DOCUMENTS

| | | | | |
|---|---|---|---|---|
| 7,926,826 | B2* | 4/2011 | Hayakawa | B62D 7/163 |
| | | | | 280/93.5 |
| 10,106,009 | B2* | 10/2018 | Hirao | B60G 17/08 |
| 10,351,162 | B1* | 7/2019 | Katzourakis | B62D 5/001 |
| 10,988,142 | B1* | 4/2021 | Mehrotra | B60W 40/068 |
| 2001/0029419 | A1* | 10/2001 | Matsumoto | B60W 40/068 |
| | | | | 701/80 |
| 2002/0007661 | A1* | 1/2002 | Takahashi | B60T 8/172 |
| | | | | 73/9 |
| 2002/0032508 | A1* | 3/2002 | Uchino | B60G 17/01933 |
| | | | | 280/5.515 |
| 2002/0072842 | A1* | 6/2002 | Kogure | B60W 40/068 |
| | | | | 701/80 |
| 2002/0088518 | A1* | 7/2002 | Dufournier | B60C 23/063 |
| | | | | 73/146 |
| 2005/0005691 | A1* | 1/2005 | Ono | B60T 8/172 |
| | | | | 73/146 |
| 2005/0085787 | A1* | 4/2005 | Laufer | A61B 17/1114 |
| | | | | 604/500 |
| 2005/0085987 | A1* | 4/2005 | Yokota | B60C 23/0477 |
| | | | | 73/146 |
| 2010/0147062 | A1 | 6/2010 | Wakao | |
| 2013/0030648 | A1* | 1/2013 | Matsumoto | B60W 30/02 |
| | | | | 701/1 |
| 2013/0138296 | A1* | 5/2013 | Kouchi | B62D 6/008 |
| | | | | 701/41 |
| 2013/0173132 | A1* | 7/2013 | Yuasa | B60W 30/0956 |
| | | | | 701/70 |
| 2017/0241778 | A1* | 8/2017 | Hanatsuka | G08G 1/13 |
| 2018/0093565 | A1* | 4/2018 | Kondo | B60W 30/18172 |
| 2018/0118209 | A1* | 5/2018 | Suzuki | B60W 40/13 |
| 2019/0047556 | A1* | 2/2019 | Mori | B60C 23/064 |
| 2019/0161085 | A1* | 5/2019 | Dudar | B60W 40/06 |
| 2019/0176834 | A1* | 6/2019 | Kanbayashi | B60T 8/176 |
| 2019/0185008 | A1* | 6/2019 | Kanbayashi | G08G 1/16 |
| 2020/0262474 | A1* | 8/2020 | Varunjikar | B60W 40/068 |
| 2020/0265588 | A1* | 8/2020 | Saito | G06T 7/00 |
| 2020/0307618 | A1* | 10/2020 | Yoshizawa | G01M 17/02 |
| 2020/0406925 | A1* | 12/2020 | Du | B60W 30/025 |
| 2021/0094552 | A1* | 4/2021 | Mori | G01W 1/00 |
| 2021/0309294 | A1* | 10/2021 | Kobayashi | B60T 8/172 |
| 2021/0310932 | A1* | 10/2021 | Toba | G01N 19/02 |
| 2022/0055623 | A1* | 2/2022 | Chae | B60W 30/18109 |

FOREIGN PATENT DOCUMENTS

| | | | | |
|---|---|---|---|---|
| JP | 06135214 | A * | 5/1994 | |
| JP | H6-135214 | | 5/1994 | |
| JP | 07144653 | A * | 6/1995 | B62D 6/006 |
| JP | 07309117 | A * | 11/1995 | |
| JP | H10-253342 | A | 9/1998 | |
| JP | 2001-088683 | A | 4/2001 | |
| JP | 2002002472 | A * | 1/2002 | |
| JP | 2003-261017 | | 9/2003 | |
| JP | 2003261017 | A * | 9/2003 | |
| JP | 2004224172 | A * | 8/2004 | B60T 8/172 |
| JP | 2005028887 | A * | 2/2005 | B60T 8/172 |
| JP | 2008-273388 | A | 11/2008 | |
| JP | 4703817 | | 6/2011 | |
| JP | 4703817 | B2 * | 6/2011 | |
| JP | 2015094680 | A * | 5/2015 | B60W 40/06 |
| JP | 2018009974 | A * | 1/2018 | B60C 19/00 |
| WO | WO-2018030001 | A1 * | 2/2018 | B60C 19/00 |
| WO | WO-2021045051 | A1 * | 3/2021 | |

* cited by examiner

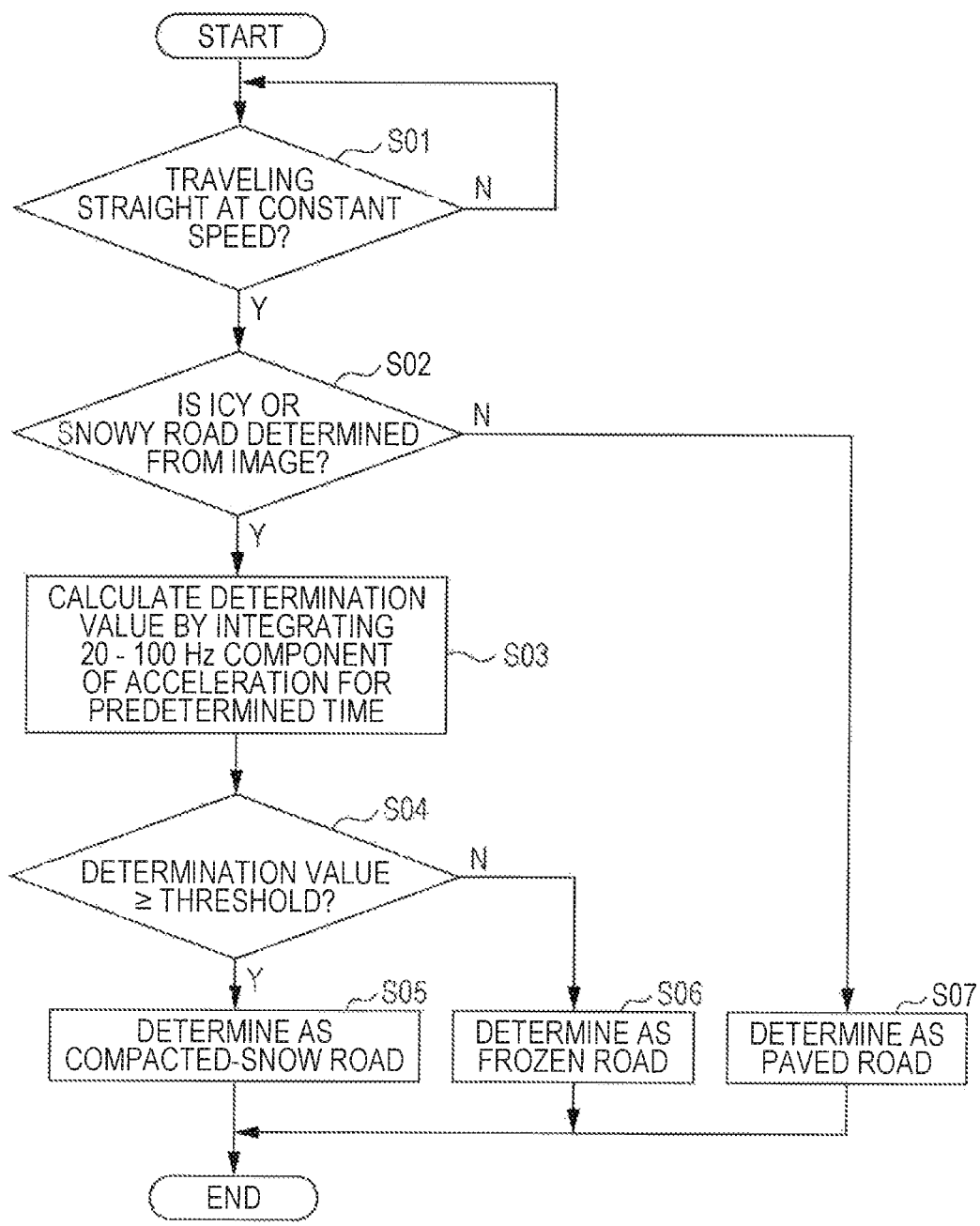

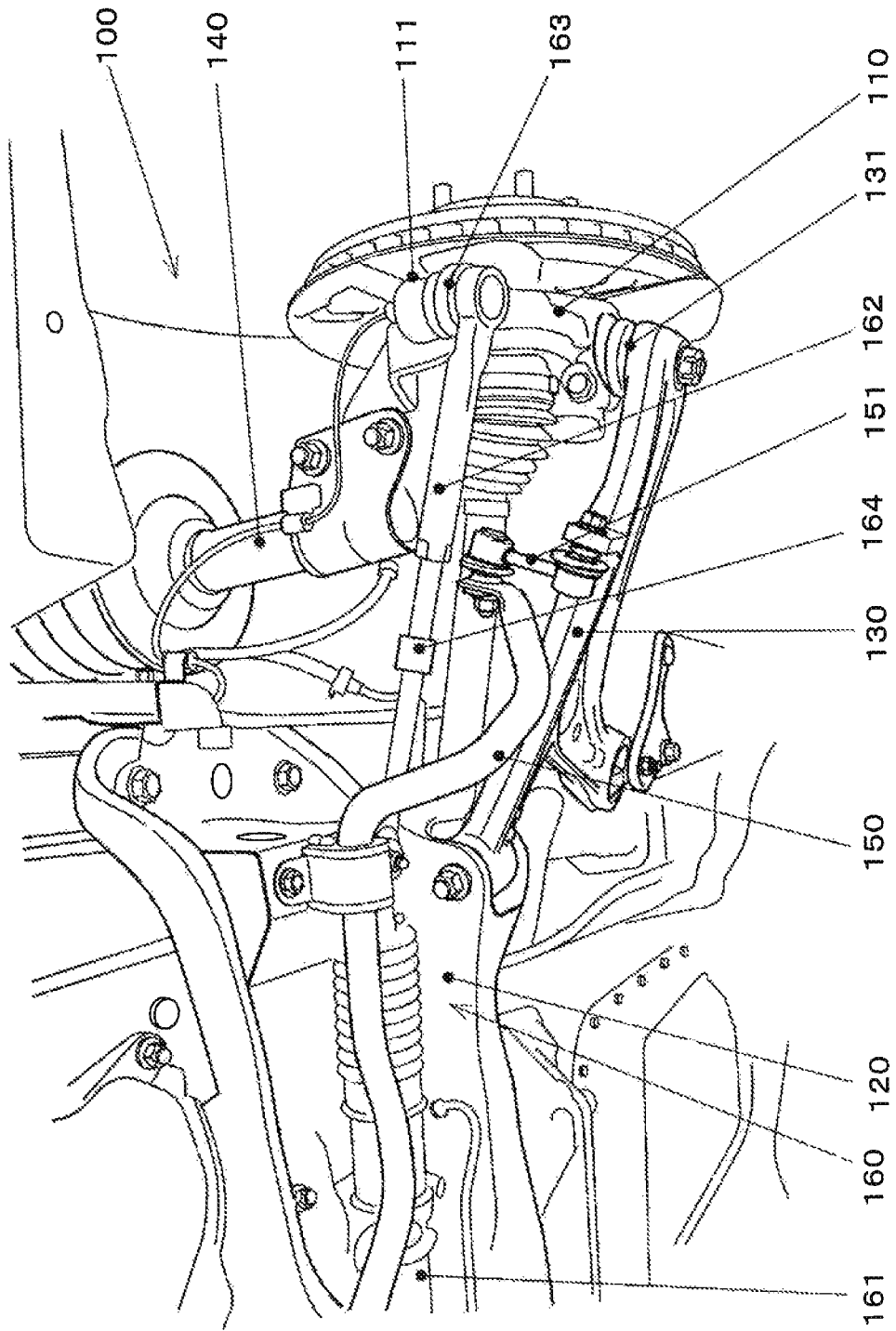

ROAD SURFACE DETERMINATION APPARATUS

CROSS-REFERENCE TO RELATED APPLICATIONS

The present application claims priority from Japanese Patent Application No. 2019-062285 filed on Mar. 28, 2019, the entire contents of which are hereby incorporated by reference.

BACKGROUND

The disclosure relates to a road surface determination apparatus that determines the condition of a road surface on which a vehicle travels.

It has been desired to determine the condition of a road surface on which a vehicle such as an automobile travels, so as to reflect the condition to various types of vehicle control or to attract attention of the user such as the driver when the vehicle enters a road with a low friction coefficient.

There have been disclosed techniques related to detection and determination of a road surface condition. For example, Japanese Unexamined Patent Application Publication No. 2003-261017 discloses a road surface μ gradient estimation apparatus that extracts a vibration component of a wheel speed signal, and estimates a road surface μ gradient based on a resonance intensity of the extracted vibration component.

Japanese Unexamined Patent Application Publication No. 6-135214 discloses a road surface determination apparatus that calculates a power spectral density of each of a plurality of frequency bands that are determined in advance based on an unsprung vertical acceleration of a suspension, and determines to which of a plurality of types of roads a road surface condition corresponds, based on weight factors on a neural network corresponding to the power spectral density of each frequency band calculated when traveling on the plurality of types of roads whose surface condition is determined in advance, and a power spectral density obtained when actually traveling on a road.

Japanese Patent No. 4703817 discloses a road surface friction coefficient estimation apparatus that calculates a waveform representing temporal changes in tire inner surface strain, and estimates a road surface friction coefficient, based on a strain displacement representing the difference between a base line strain value, which is the mean value of the tire inner surface strain on a part other than the tire tread, and the tire inner surface strain on the tire tread.

SUMMARY

An aspect of the disclosure provides a road surface determination apparatus. The apparatus includes an acceleration detector and a road surface determination unit.

The acceleration detector configured to detect an acceleration of a vehicle body or a vibration transmission member configured to transmit vibration from a tire to the vehicle body. The road surface determination unit is configured to determine a condition of a surface of a road, using a determination value obtained by extracting a component of a predetermined frequency band from the acceleration detected by the acceleration detector and integrating the component.

An aspect of the disclosure provides a road surface determination apparatus. The apparatus includes an acting force detector and a road surface determination unit. The acting force detector is configured to detect an acting force that acts on a vehicle body or a vibration transmission member configured to transmit vibration from a tire to the vehicle body. The road surface determination unit is configured to determine a condition of a surface of a road, using a determination value obtained by extracting a component of a predetermined frequency band from the acting force detected by the acting force detector and integrating the component.

An aspect of the disclosure provides a road surface determination apparatus. The apparatus includes an acceleration detector and circuitry. The acceleration detector configured to detect an acceleration of a vehicle body or a vibration transmission member configured to transmit vibration from a tire to the vehicle body. The circuitry is configured to determine a condition of a surface of a road, using a determination value obtained by extracting a component of a predetermined frequency band from the acceleration detected by the acceleration detector and integrating the component.

An aspect of the disclosure provides a road surface determination apparatus. The apparatus includes an acting force detector and circuitry. The acting force detector is configured to detect an acting force that acts on a vehicle body or a vibration transmission member configured to transmit vibration from a tire to the vehicle body. The circuitry is configured to determine a condition of a surface of a road, using a determination value obtained by extracting a component of a predetermined frequency band from the acting force detected by the acting force detector and integrating the component.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 2 is a flowchart illustrating the operation of the road surface determination apparatus according to the first embodiment; and FIG. 3 is an external perspective view of a front suspension of a vehicle provided with a road surface determination apparatus according to a second embodiment of the present disclosure.

DETAILED DESCRIPTION

Figure 1:
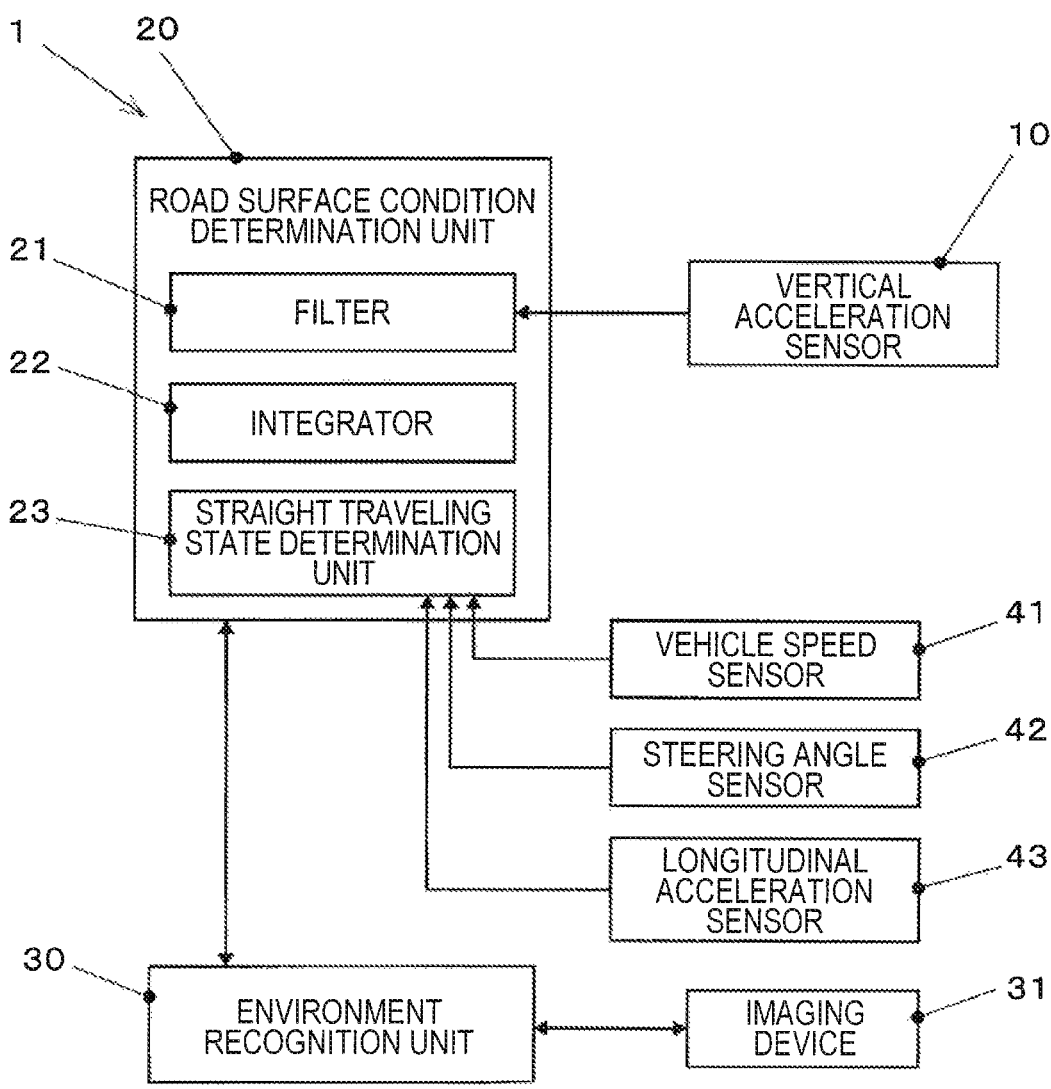
FIG. 1 is a block diagram schematically illustrating the configuration of a road surface determination apparatus according to a first embodiment of the present disclosure.

According to the related-art road surface condition estimation technique described above, the road surface condition is estimated when lateral skid or longitudinal slip of tires occurs, such as when the vehicle is turning or accelerating.

Accordingly, when the vehicle is traveling straight at a substantially constant vehicle speed, neither lateral skid nor longitudinal slip occurs, and hence the road surface condition cannot be estimated.

Moreover, according to the related-art road surface condition estimation technique, the parameters necessary for the estimation are obtained on the unsprung side of the vehicle. Therefore, the configuration of the apparatus such as the sensor arrangement and sensor output wiring is complicated, which makes it difficult to mount the apparatus in actual vehicles.

It is desirable to provide a road surface determination apparatus capable of determining a road surface condition even when the tires are not slipping, with a simple configuration.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Hereinafter, a road surface determination apparatus according to a first embodiment of the present disclosure will be described.

The road surface determination apparatus of the first embodiment is, for instance, installed on an automobile such as a passenger car, and is configured to determine the condition of a road surface on which the vehicle is traveling.

FIG. 1 is a block diagram schematically illustrating the configuration of a road surface determination apparatus 1 according to the first embodiment.

The road surface determination apparatus 1 includes a vertical acceleration sensor 10, a road surface condition determination unit 20, an environment recognition unit 30, a vehicle speed sensor 41, a steering angle sensor 42, and a longitudinal acceleration sensor 43.

The vertical acceleration sensor 10 is disposed on a part of the vehicle body to which a wheel is attached through a suspension apparatus. The vertical acceleration sensor 10 serves as a "acceleration detector" configured to detect an acceleration in the vertical direction at an attachment part.

The vertical acceleration sensor 10 is attached to, for example, a cross member, which is a beam-shaped structural member disposed along a floor part of the vehicle body.

The output of the vertical acceleration sensor 10 is transmitted to the road surface condition determination unit 20.

The environment recognition unit 30 is coupled to a processor that serves as the road surface condition determination unit 20. The road surface condition determination unit 20 is configured to determine the condition of a road surface on which the vehicle is traveling, based on the output of the vertical acceleration sensor 10. In one embodiment, the road surface condition determination unit 20 may serve as a "road surface determination unit".

The road surface condition determination unit 20 includes a filter 21, an integrator 22, and a straight traveling state determination unit 23.

The filter 21 is a bandpass filter that extracts a component of a predetermined frequency band from the output of the vertical acceleration sensor 10.

The filter 21 may include, for example, a Chebyshev filter.

The integrator 22 is configured to integrate the filtered acceleration output by the filter 21, over a predetermined time.

The straight traveling state determination unit 23 is configured to determine whether the vehicle is traveling straight at a substantially constant vehicle speed, for example.

The functions of the road surface condition determination unit 20 will be described in detail below.

The environment recognition unit 30 is configured to recognize the environment around the vehicle.

The environment recognition unit 30 has a function for detecting the lane shape of the road ahead of the vehicle and obstacles such that the detected result is used in, for example, driving assist control or and autonomous driving control.

The environment recognition unit 30 is provided with an imaging device 31 that images the area including the road surface ahead of the vehicle.

The imaging device 31 may be a stereo camera device having a pair of cameras disposed apart from each other in the vehicle width direction, for example.

The vehicle speed sensor 41 generates a vehicle speed signal at a frequency proportional to the rotational speed of a wheel, for example, and thus is used for detecting a traveling speed (vehicle speed) of the vehicle.

The steering angle sensor 42 is configured to detect a steering angle of a steering device (rotational angle of a steering wheel) that steers the front wheels of the vehicle.

The longitudinal acceleration sensor 43 is configured to detect a longitudinal acceleration applied to the vehicle body.

The longitudinal acceleration sensor 43 may be, for example, an integral unit with the vertical acceleration sensor 10 described above.

The following describes the operation of the road surface determination apparatus 1 according to the first embodiment.

FIG. 2 is a flowchart illustrating the operation of the road surface determination apparatus 1 according to the first embodiment.

The following describes the operation step by step.

<Step S01: Constant Speed Straight Traveling State Determination>

The straight traveling state determination unit 23 of the road surface condition determination unit 20 determines whether the vehicle is traveling straight at a substantially constant vehicle speed, based on the outputs of the vehicle speed sensor 41, the steering angle sensor 42, and the longitudinal acceleration sensor 43.

For example, if a vehicle speed V detected by the vehicle speed sensor 41 is greater than or equal to a predetermined value (for example, 20 km/h); if the steering angle (steering wheel angle) δ detected by the steering angle sensor 42 is within a predetermined range (for example, $-5$ degrees $\leq \delta \leq 5$ degrees); and if a longitudinal acceleration GX detected by the longitudinal acceleration sensor 43 is within a predetermined range (for example, $-5$ m/s2$\leq$GX$\leq$5 m/s2), the vehicle is determined to be traveling straight.

If the vehicle is determined to be traveling straight, the process proceeds to step S02. Otherwise, the process repeats step S01.

<Step S02: Icy or Snowy Road Determination>

The road surface condition determination unit 20 determines whether the road on which the vehicle is currently traveling is an icy or snowy road including a frozen road and a compacted-snow road, based on the information from the environment recognition unit 30.

For example, if in an image captured by the imaging device 31, the average luminance value of the pixels in the area corresponding to the lane on which the vehicle is traveling is greater than or equal to a predetermined threshold, the road may be determined to be an icy or snowy road.

In one embodiment, the environment recognition unit 30 and the imaging device 31 may serve as an "icy or snowy road determination unit" that determines whether the vehicle is traveling on an icy or snowy road.

If the road is determined to be an icy or snowy road, the process proceeds to step S03. Otherwise, the process proceeds to step S07.

<Step S03: Acceleration Filtering•Integrated Value Calculation>

The filter 21 of the road surface condition determination unit 20 extracts a component of a predetermined frequency band from the output value of the vertical acceleration sensor 10.

For example, the filter 21 may be configured to extract a component of 20 to 100 Hz.

The integrator 22 integrates the absolute value of the acceleration bandpass filtered by the filter 21, over a predetermined time (for example, 1 second).

The road surface condition determination unit 20 uses this integrated value as a determination value.

Then, the process proceeds to step S04.

<Step S04: Comparison of Determination Value with Threshold>

The road surface condition determination unit 20 compares the determination value calculated in step S03 with a predetermined threshold.

If the determination value is greater than or equal to the threshold, the process proceeds to step S05. Otherwise, the process proceeds to step S06.

<Step S05: Compacted-Snow Road Determination>

The road surface condition determination unit 20 determines that the road on which the vehicle is currently traveling is a compacted-snow road.

Then, a series of operations ends (returns to the start).

<Step S06: Frozen Road Determination>

The road surface condition determination unit 20 determines that the road on which the vehicle is currently traveling is a frozen road, which is relatively smoother than the compacted-snow road.

In this case, the friction coefficient is usually lower than that of compacted-snow roads. Therefore, the road surface condition determination unit 20 attracts attention of the user such as the driver, by using an indicator (not illustrated) or the like.

Further, a change may be made in control such as vehicle body behavior stabilization control, traction control, AWD transfer clutch engagement force control, in response to a signal from the road surface condition determination unit 20.

Furthermore, in the case of a vehicle that performs autonomous driving control, a change may be made to the autonomous driving scenario including a target traveling line, and a target vehicle speed.

Then, a series of operations ends.

<Step S07: Paved Road Determination>

The road surface condition determination unit 20 determines that the road on which the vehicle is currently traveling is a paved road.

Then, a series of operations ends.

According to the first embodiment described above, the following effects can be obtained.

(1) Changes in the frequency distribution of the vibration transmitted from the tire to the vehicle body are detected using the vertical acceleration sensor 10. Accordingly, even when the vehicle is traveling straight at a substantially constant vehicle speed with substantially no slipping of the tires, the condition of the road surface can be appropriately determined with a simple device configuration.

(2) The determination value is obtained by extracting a predetermined frequency component from the output of the vertical acceleration sensor 10 and integrating the component. If the determination value is greater than or equal to the threshold, the road is determined to be a compacted-snow road. Otherwise, the road is determined to be a frozen road. Accordingly, a compacted-snow road and a frozen road can be appropriately distinguished from each other based on their difference in smoothness of the road surface.

(3) The determination value is obtained by extracting a frequency component of 20 to 100 Hz with the filter. Accordingly, a compacted-snow road and a frozen road can be appropriately distinguished each other, in a vehicle with a usual configuration.

(4) The road surface condition is determined using the vertical acceleration of the vehicle body, only when the vehicle is determined to be traveling on an icy or snowy road, using the imaging device. Therefore, it is possible to prevent the road from being erroneously determined as a frozen road or the like when the vehicle is traveling on a flat paved road.

Second Embodiment

Hereinafter, a road surface determination apparatus according to a second embodiment of the present disclosure will be described.

Elements identical to those in the first embodiment are denoted by the same reference numerals and will not be described further. The following mainly describes the differences from the first embodiment.

A road surface determination apparatus of the second embodiment includes an axial force sensor 164 that detects an axial force of a tie rod 162 of a steering device 160 that steers the front wheels, in place of the vertical acceleration sensor 10 of the first embodiment. The road surface determination apparatus extracts a component of the axial force of a predetermined frequency band, and integrates the component over a predetermined time to obtain a determination value.

FIG. 3 is an external perspective view of a front suspension of a vehicle provided with the road surface determination apparatus according to the second embodiment.

FIG. 3 illustrates the front suspension as viewed from the obliquely lower front side of the vehicle body.

A suspension apparatus 100 includes a housing 110, a cross member 120, a lower arm 130, a strut 140, a stabilizer 150, and a steering device 160.

The housing (knuckle) 110 is a member that accommodates a hub bearing rotatably supporting a wheel.

An upper end of the housing 110 is fastened to a bracket disposed at the lower end of the strut 140.

A lower end of the housing 110 is turnably coupled to an end of the lower arm 130 via a ball joint 131.

The housing 110 includes a knuckle arm 111 projecting to the front side of the vehicle.

The knuckle arm 111 is a part connected to the tie rod 162 to input a force in the turning direction to the housing 110.

The cross member 120 is a structural member attached to a lower part of a front side frame of the vehicle body and extending in the vehicle width direction.

The cross member 120 serves as a vehicle-body-side attachment part for the lower arm 130, the stabilizer 150, and the steering device 160.

The lower arm 130 is a suspension arm (transverse link) swingably (turnably) coupled to the vehicle body including the cross member 120, and to the housing 110.

A vehicle-body-side end of the lower arm 130 is turnable about an axis extending substantially in the vehicle longitudinal direction, via a pair of front and rear elastic bushes.

An outer end of the lower arm 130 in the vehicle width direction is coupled to the housing 110 via the ball joint 131.

The strut 140 includes, as integral parts, a shock absorber (damper) serving as a hydraulic buffer, and a coil spring disposed parallel thereto.

An upper end of the strut 140 is fastened to an upper part of a strut tower formed on the vehicle body via a top mount (not illustrated).

The top mount includes a bearing that allows the main body of the strut 140 to rotate together with the housing 110 when the vehicle is turning.

The stabilizer 150 includes a stabilizer bar that is coupled to the lower arm 130 via a link 151, and couples right and left suspension links. The stabilizer 150 serves as an anti-roll device that generates a force in a direction for reducing the stroke difference between the right and left suspensions when such a stroke difference occurs.

The steering device 160 is configured to steer the vehicle by turning each of the right and left housings 110 and struts 140 about a predetermined kingpin axis (an axis connecting a top mount bearing of the strut 140 and the ball joint 131 of the lower arm 130).

The steering device 160 includes a steering gear box 161, and the tie rods 162.

The steering gear box 161 includes a steering rack (not illustrated) that moves in parallel in the vehicle width direction, in response to a steering operation by the driver, or a turning command based on autonomous driving control.

The tie rod 162 is a member that couples an end of the steering rack and the knuckle arm 111 of the housing 110 to transmit a steering rack thrust to the housing 110, and also transmits a tire reaction force from the housing 110 side to the steering rack.

An outer end of the tie rod 162 in the vehicle width direction is coupled to the knuckle arm 111 of the housing 110 via a ball joint 163.

The axial force sensor 164 that detects an axial force acting on the tie rod 162 using, for example, a load cell or a strain gauge, is disposed at the middle portion of the tie rod 162.

In one embodiment, the axial force sensor 164 may serves as an "acting force detector" configured to detect a force acting on the tie rod 162 serving as a vibration transmission member that transmits vibration from the tire to the vehicle body.

In the second embodiment, the output of the axial force sensor 164 provided in place of the vertical acceleration sensor 10 of the first embodiment is bandpass filtered and integrated to obtain a determination value.

The frequency band extracted by filtering may be the same as that of the first embodiment described above.

According to the second embodiment described above, the same effects as those obtained in the first embodiment can be obtained.

(Modifications)

The present disclosure is not limited to the embodiments described above, and various modifications and changes are possible and are also within the technical scope of the present disclosure.

(1) The configurations of the road surface determination apparatus, the suspension apparatus, and the vehicle on which these apparatuses are mounted is not limited to those described in the above embodiments, and may be appropriately changed.

For instance, in the first embodiment, the vertical acceleration sensor is disposed on the cross member of the floor part of the vehicle body. In the second embodiment, the axial force sensor (acting force sensor) is disposed on the tie rod. However, the arrangement positions of these sensors are not limited thereto, and may be appropriately changed to a position on any member that transmits vibration from the tires to the vehicle body, such as a wheel rim, a suspension arm, and the vehicle body other than the floor part.

(2) In the above embodiments, the component of 20 to 100 Hz, for instance, is extracted from the vehicle body vertical acceleration or the tie rod axial force detected by the corresponding sensor so as to be used for determination. However, the frequency band to be extracted may be appropriately changed according to the vibration transmission characteristics of the vehicle. Further, the time over which the output is integrated is not especially limited.

(3) In the above embodiments, a determination of an icy or snowy road is made based on image processing using the imaging device. However, the method of determining an icy or snowy road is not limited thereto, and may be appropriately changed.

For instance, a determination of an icy or snowy road may be made based on road information or weather information obtained via a communication unit, or in response to the user such as the driver selecting a rough road mode, an icy or snowy road mode, or the like, in the AWD control mode when the outside temperature is less than or equal to a predetermined temperature.

According to the present disclosure, changes in frequency distribution of the vibration transmitted from the tires to the vehicle body or the acting force are detected. Accordingly, even when the vehicle is traveling straight at a substantially constant vehicle speed with substantially no slipping of the tires, the condition of the road surface can be appropriately determined with a simple device configuration. Also, a compacted-snow road and a frozen road can be appropriately distinguished from each other based on their difference in smoothness of the road surface.

Further, a compacted-snow road and a frozen road can be appropriately distinguished from each other, in a vehicle with a usual configuration.

Further, it is possible to prevent the road from being erroneously determined as a frozen road or the like when the vehicle is traveling on a flat paved road.

Further, by using an image captured by the imaging device that is used for driving assistance, for example, it is possible to more appropriately determine whether the vehicle is traveling on an icy or snowy road, with a simple configuration.

As described above, according to the present disclosure, it is possible to provide a road surface determination apparatus capable of determining a road surface condition with a simple configuration even when the tires are not slipping.

The invention claimed is:

1. A road surface determination apparatus for a vehicle with a vehicle body, comprising:
   an acceleration detector that is mounted on the vehicle body and is configured to detect an acceleration in a vertical direction of the vehicle body; and
   a road surface determination unit configured to determine a condition of a surface of a road, using a determination value obtained by extracting a component of a predetermined frequency band from the acceleration detected by the acceleration detector and integrating the component, and
   wherein the road surface determination unit determines the condition of the surface of the road with prerequisites of the vehicle being determined to be traveling both within a straight travel parameter and a constant speed parameter, and wherein the road surface determination unit is further configured for controlling the vehicle based on a determination of the condition of the road surface.

2. The road surface determination apparatus according to claim 1, wherein:
   the road surface determination unit determines that the road is a compacted-snow road when the determination value is greater than or equal to a predetermined threshold; and
   the road surface determination unit determines that the road is a frozen road when the determination value is less than the threshold.

3. The road surface determination apparatus according to claim 2, wherein the predetermined frequency band is from 20 to 100 Hz.

4. The road surface determination apparatus according to claim 2, further comprising:
   an icy or snowy road determination unit configured to determine whether a vehicle is traveling on an icy or snowy road;
   wherein the road surface determination unit determines the condition of the surface of the road only upon a prerequisite that the vehicle is determined to be traveling on an icy or snowy road.

5. The road surface determination apparatus according to claim 4, wherein the icy or snowy road determination unit determines whether the vehicle is traveling on an icy or snowy road based on an image obtained by imaging a surface of a road ahead of the vehicle.

6. The road surface determination apparatus according to claim 1, wherein the predetermined frequency band is from 20 to 100 Hz.

7. The road surface determination apparatus according to claim 1, further comprising:
   an icy or snowy road determination unit configured to determine whether a vehicle is traveling on an icy or snowy road;
   wherein the road surface determination unit determines the condition of the surface of the road only upon a prerequisite that the vehicle is determined to be traveling on an icy or snowy road.

8. The road surface determination apparatus according to claim 7, wherein the icy or snowy road determination unit determines whether the vehicle is traveling on an icy or snowy road based on an image obtained by imaging a surface of a road ahead of the vehicle.

9. A road surface determination apparatus for a vehicle, comprising:
   an axial force sensor that is mounted on a tie rod of a steering device of the vehicle and is configured to detect an axial force of the tie rod; and
   a road surface determination unit configured to determine a condition of a surface of a road, using a determination value obtained by extracting a component of a predetermined frequency band from the axial force detected by axial force sensor and integrating the component, and
   wherein the road surface determination unit determines the condition of the surface of the road with prerequisites of the vehicle being determined to be traveling both within a straight travel parameter and a constant speed parameter, and wherein the road surface determination unit is further configured for controlling the vehicle based on a determination of the condition of the road surface.

10. The road surface determination apparatus according to claim 9, wherein:
    the road surface determination unit determines that the road is a compacted-snow road when the determination value is greater than or equal to a predetermined threshold; and
    the road surface determination unit determines that the road is a frozen road when the determination value is less than the threshold.

11. The road surface determination apparatus according to claim 10, wherein the predetermined frequency band is from 20 to 100 Hz.

12. The road surface determination apparatus according to claim 10, further comprising:
    an icy or snowy road determination unit configured to determine whether a vehicle is traveling on an icy or snowy road;
    wherein the road surface determination unit determines the condition of the surface of the road only upon a prerequisite that the vehicle is determined to be traveling on an icy or snowy road.

13. The road surface determination apparatus according to claim 12, wherein the icy or snowy road determination unit determines whether the vehicle is traveling on an icy or snowy road based on an image obtained by imaging a surface of a road ahead of the vehicle.

14. The road surface determination apparatus according to claim 9, wherein the predetermined frequency band is from 20 to 100 Hz.

15. The road surface determination apparatus according to claim 9, further comprising:
    an icy or snowy road determination unit configured to determine whether a vehicle is traveling on an icy or snowy road;
    wherein the road surface determination unit determines the condition of the surface of the road only upon a prerequisite that the vehicle is determined to be traveling on an icy or snowy road.

16. The road surface determination apparatus according to claim 15, wherein the icy or snowy road determination unit determines whether the vehicle is traveling on an icy or snowy road based on an image obtained by imaging a surface of a road ahead of the vehicle.

17. A road surface determination apparatus for a vehicle with a vehicle body, comprising:
    an acceleration sensor that is mounted on the vehicle body and is configured to detect an acceleration in a vertical direction of the vehicle body; and circuitry configured to determine a condition of a surface of a road, using a determination value obtained by extracting a component of a predetermined frequency band from the acceleration detected by the acceleration sensor and integrating the component, and wherein the circuitry is configured to determine the condition of the surface of the road with prerequisites of the vehicle being determined to be traveling both within a straight travel parameter and a constant speed parameter, and wherein the circuitry is further configured for controlling the vehicle based on a determination of the condition of the road surface.

18. A road surface determination apparatus for a vehicle, comprising:

- an axial force sensor that is mounted on a tie rod of a steering device of the vehicle and is configured to detect an axial force of the tie rod; and
- circuitry configured to determine a condition of a surface of a road, using a determination value obtained by extracting a component of a predetermined frequency band from the axial force detected by the axial force sensor and integrating the component, and
- wherein the circuitry is configured to determine the condition of the surface of the road with prerequisites of the vehicle being determined to be traveling both within a straight travel parameter and a constant speed parameter, and wherein the circuitry is further configured for controlling the vehicle based on a determination of the condition of the road surface.

* * * * *